United States Patent
Hsiu-Ping et al.

(10) Patent No.: US 7,188,312 B2
(45) Date of Patent: Mar. 6, 2007

(54) REMOTE DOCUMENT VIEWING SYSTEM, DEVICE, AND METHOD THEREOF

(75) Inventors: Lin Hsiu-Ping, Taipei (TW); Luo Jui-Ching, Taipei (TW)

(73) Assignee: Ap-Mobile Technology Inc., Taipei (TW)

( * ) Notice: Subject to any disclaimer, the term of this patent is extended or adjusted under 35 U.S.C. 154(b) by 289 days.

(21) Appl. No.: 10/918,046

(22) Filed: Aug. 12, 2004

(65) Prior Publication Data

US 2006/0036940 A1 Feb. 16, 2006

(51) Int. Cl.
*G06F 17/21* (2006.01)
*G06F 17/24* (2006.01)

(52) U.S. Cl. .................. 715/525; 715/500; 715/513; 715/514; 715/515

(58) Field of Classification Search .............. 715/500, 715/513, 514, 515, 525
See application file for complete search history.

(56) References Cited

U.S. PATENT DOCUMENTS

| | | | | |
|---|---|---|---|---|
| 6,311,180 | B1* | 10/2001 | Fogarty | 707/4 |
| 6,501,956 | B1* | 12/2002 | Weeren et al. | 455/463 |
| 6,581,094 | B1* | 6/2003 | Gao | 709/220 |
| 6,865,608 | B2* | 3/2005 | Hunter | 709/229 |
| 2001/0047397 | A1* | 11/2001 | Jameson | 709/217 |
| 2001/0047426 | A1* | 11/2001 | Hunter | 709/238 |

* cited by examiner

*Primary Examiner*—Stephen Hong
*Assistant Examiner*—Joshua D Campbell (57) ABSTRACT

A remote document viewing system that allows wireless handheld devices equipped with only built-in browsers to view document files stored in remote computers in real time without downloading the entire document files first onto the wireless handheld devices, and without requiring the wireless handheld devices to pre-install any special applications. The document file content is converted into a series of web pages optimized for the display of the wireless handheld device.

19 Claims, 8 Drawing Sheets

REMOTE DOCUMENT VIEWING SYSTEM, DEVICE, AND METHOD THEREOF

BACKGROUND OF THE INVENTION

1. Field of the Invention

The present invention relates to the remote document viewing, and in particular to the use of wireless devices to view document files stored in a remote computer in real time.

2. The Prior Arts

As the technology progresses, small handheld devices such as the mobile handsets and Personal Digital Assistants (PDAs) are becoming more and more popular due to their small form factor and ease of use. People also rely more and more on such devices to store their vital information while they are away from home or office. However, due to the devices' limited capability and the wireless infrastructure's limited bandwidth, it is still inefficient in using these devices to access information stored in a remote computer in a real-time fashion.

In the commercial world, such timely access to important business information is of extreme importance. Business people have long been hoping to use their handheld devices to remotely access the document files stored in their office computers. These document files are usually in the Microsoft Word, Excel, Powerpoint formats. At present, most mobile service operators have been offering GPRS services or even the so-called 3G network services which allow mobile handsets or PDAs equipped with GSM/GPRS modules to connect to the public Internet, which in turn connect to a computer accessible from the public Internet. Prior arts require that the handheld devices are installed with appropriate applications to view the Word, Excel, and Powerpoint files and these files have to be completely downloaded first onto the handheld devices over the wireless connection.

There are several disadvantages in prior arts' download-before-read approach. First, the files are usually quite big compared to the limited memory capacity of the handheld devices. A single such file may consume all the available memory of a handheld device. Secondly, downloading the entire file usually takes a significant amount of time due to the limited wireless connection bandwidth. Thirdly, the handheld devices have a limited viewing area that is much smaller than a computer screen and inferior color imaging capability. The file content (both text and graphics) has to be re-formatted to fit the small LCD screen of a handheld device. At last, the prior arts require the installation of special applications on a handheld device. However, the handheld devices are evolving at a tremendous speed and the handheld devices lack a common platform standard upon which the special applications can be developed without being tailored for various platforms.

SUMMARY OF THE INVENTION

To overcome the foregoing disadvantages, the present invention provides a remote document viewing system that allows wireless handheld devices equipped with only a built-in browser to view document files stored in remote computers in real time without downloading the entire document files first onto the wireless handheld devices.

The present invention does not require the wireless handheld device to be installed with any special application in order to view the document files. Another objective of the present invention is to provide the devices and methods that can determine the display characteristics of the wireless handheld device in order to generate the optimal display effect for viewing the document files on the wireless handheld device.

Another objective of the present invention is to provide the devices and methods that can transmit the right portion of the document file in a correct sequence to the wireless handheld device by using a session management technique.

The remote document viewing system provided by the present invention contains a plurality of electronic devices, a management device, and a plurality of wireless terminal devices. Each electronic device further contains a plurality of directories, each of which in turn contains a plurality of document files respectively. Each electronic device also contains a browsing management unit that gathers and provides the directory and document file information to the management device. Based on the information provided by the browsing management unit, the management device adopts an appropriate processing method to convert a document file's text and graphic content into a number of web pages that are suitable for a built-in browser in the wireless terminal device. The wireless terminal device issues an access request from its built-in browser and views the converted web pages via an air interface between the wireless terminal device and the management device.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
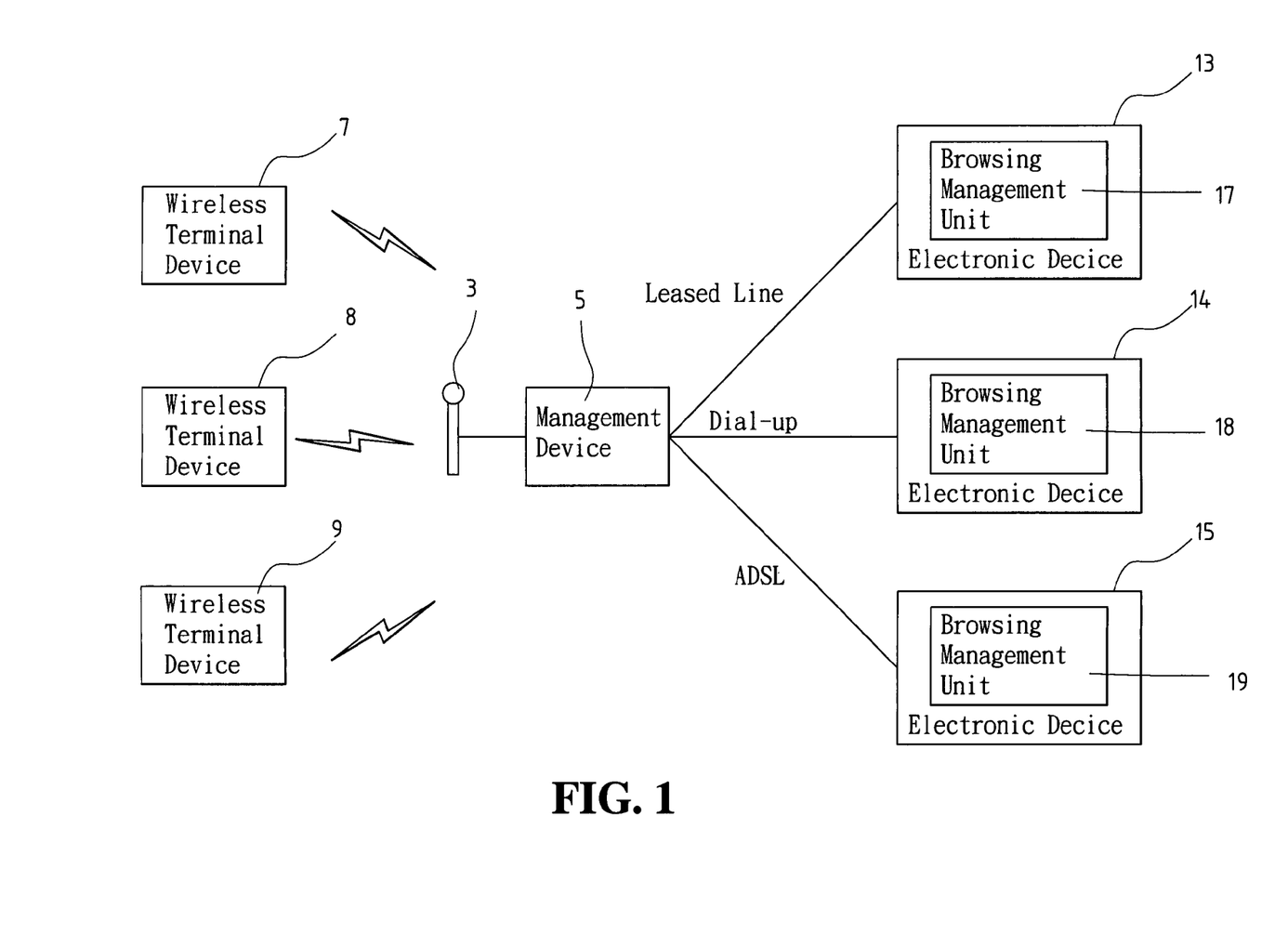
FIG. 1 is a schematic diagram showing the remote document viewing system according to the present invention.

FIG. 1 is a schematic diagram showing a remote document viewing system according to the present invention. As shown in FIG. 1, the remote document viewing system contains electronic devices 13–15, a management device 5, and wireless terminal devices 7–9. The electronic devices 13–15 can be any computing devices that are accessible to the management device 5 over various networking connections. The electronic device can be a desktop computer, a server computer, or a notebook computer. The networking connection between the management device and the electronic devices can be a leased line connection, a local area network connection, or a public Internet connection via ADSL, dial-up, or cable modem. The wireless terminal devices 7–9 can be any device having a wireless networking capability such as a PHS handset, an i-Mode handset, a GPRS handset, a PDA with appropriate networking module, a Pocket PC with appropriate networking module, or a notebook computer with appropriate networking module. The management device 5 receives an access request issued by a built-in browser in the wireless terminal devices 7–9 via an air interface between the wireless terminal devices 7–9 and a wireless base station 3 connected to the management device 5. The access request specifies a specific document file stored in one of the electronic devices 13–15. The document file can be a file containing text and graphics, a spreadsheet file, a presentation file, an image file, a Portable Document Format (PDF) file, a text file, or a HTML file. The management device 5 converts the content of the requested document file into appropriate web pages and transmit the web pages to one of the wireless terminal devices 7–9 issuing the access request. The web pages can have one of the following formats: WML, DHTML, PDX, CHTML, XML, or XHTML.

The major function of the management device 5 lies in that, when one of the wireless terminal devices 7–9 would like to view a document file stored in one of the electronic devices 13–15, the management device 5 converts the document file's content in real time into web pages viewable by a browser so that wireless terminal devices 7–9 with only a built-in browser can view the remote document file indirectly without pre-installation of special applications for opening and reading the remote document files.

More specifically, if a PHS handset 7 issues an access request to view a document file stored in the electronic device 13 which is a desktop computer in the office, the browsing management unit 17 inside the electronic device 13 first provides the information about the directories and the document files inside these directories in the electronic device 13 to the management device 5. After receiving such information, the management device 5 converts the information (such as directory and document file names) into web pages and transmits the web pages to the wireless terminal device 7.

From the provided web pages, a user of the PHS handset 7 specifies a specific document file (such as a quotation file in Word format) and a request is thereby sent to the management device 5, the management device 5 determines that the file is of the Word format and adopts a corresponding process method to convert the document file's text and graphic content into web pages viewable by a browser in the PHS handset 7.

Therefore, the remote document viewing system provided by the present invention is to convert the remote document file into browser-viewable web pages in real time so that a wireless terminal device equipped only with a browser can view the remote document without pre-installation of any special application. In the following, detailed description will be given towards the elements contained inside the management device 5 so that the other objectives of the present invention can be further understood.

Figure 2:
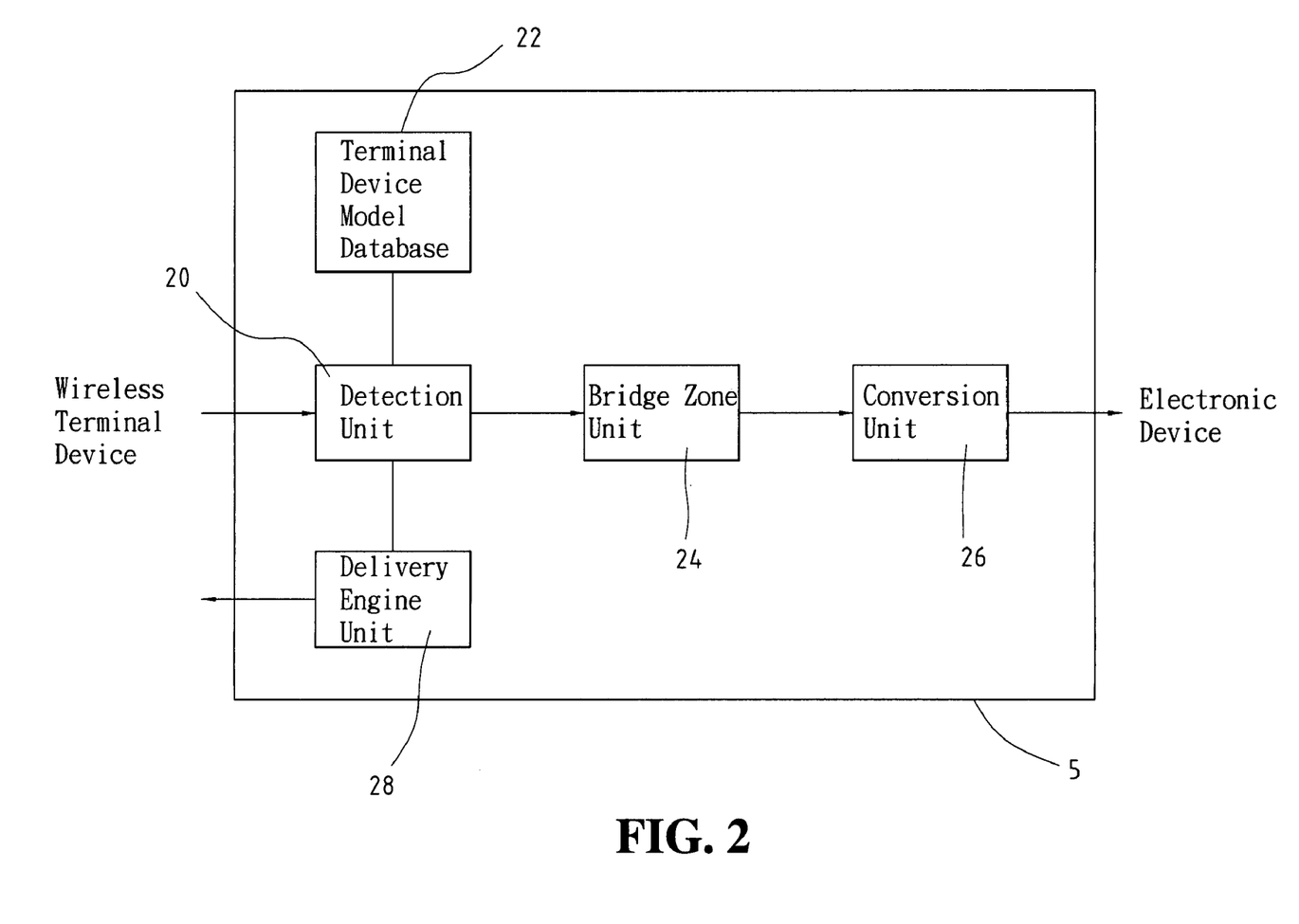
FIG. 2 is a schematic diagram showing a first embodiment of the management device according to the present invention.

FIG. 2 is schematic diagram showing a first embodiment of the management device according to the present invention. As shown in FIG. 2, the management device 5 further contains a detection unit 20, a bridge zone unit 24, a conversion unit 26, and a delivery engine unit 28.

When converting a document file content, the management device 5 first determines the display characteristics of the one wireless terminal device 7–9 issuing the access request by the detection unit 20. The bridge zone unit 24 then generates a matching code based on the display characteristics. The conversion unit 26 in turn, based on the matching code and the access request, converts the requested document file content into web pages. Finally, the converted web pages are transmitted to the one wireless terminal device 7–9 issuing the access request by the delivery engine unit 28. The display characteristics of a wireless terminal device includes, but not limited to, the wireless terminal device's brand, model, screen size, resolution, color depth, buffer size, special presentation, and special effect, etc. For simplicity, a complete listing of the entire set of display characteristics information will not be given here.

Figure 3:
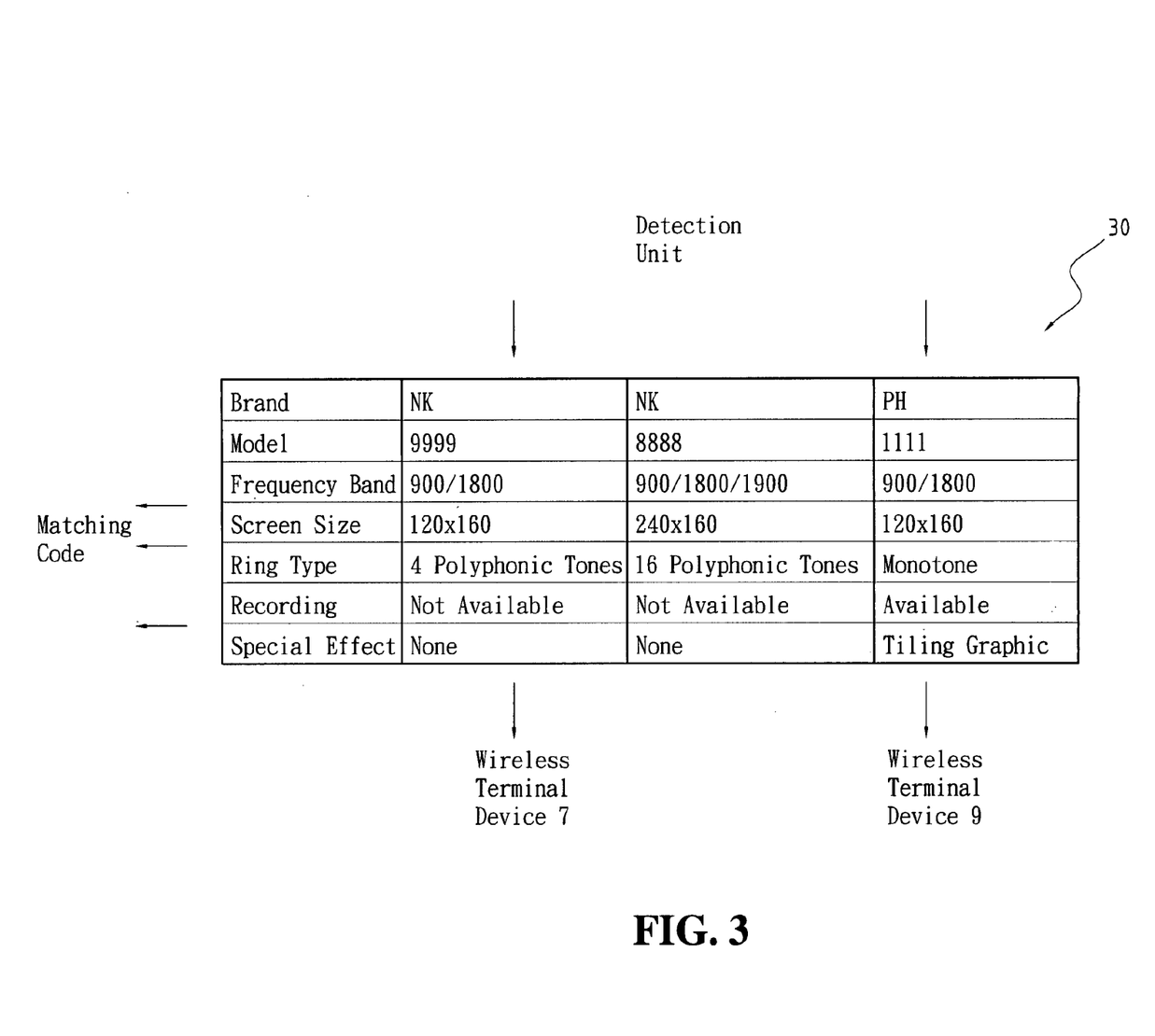
FIG. 3 is a schematic diagram showing the generation of the matching code according to the present invention.

FIG. 3 is a schematic diagram showing the generation of the matching code according to the present invention. As shown in FIG. 3, the detection unit 20 utilizes the data table 30 stored in the terminal device model database 22 (shown in FIG. 2) to discover the display characteristics of the wireless terminal devices 7–9. For example, the wireless terminal device 7 is recorded in the database with the following information: the model is "9999," the frequency band is "900/1800," the screen size is "120×160 pixels," the ring type is "4 polyphonic tones," the recording capability is "not available," and the special effect is "none." For another example, the wireless terminal device 9 is recorded with the following information: the model is "1111," the frequency band is "900/1800," the screen size is "120×160 pixels," the ring type is "monotone," the recording capability is "available," and the special effect is "tiling graphics."

The bridge zone unit 24 then combines a number of the characteristics information items from the wireless terminal model database into a matching code corresponding to the wireless terminal device. For example, the matching codes for wireless terminal devices 7 and 9 can be generated by combining screen size, ring type, and special effect. Please note that the set of characteristics information items used in generating a matching code for one wireless terminal device is not necessarily identical to that used for another wireless terminal device.

The purpose for discovering the display characteristics information and generating the matching code lies in that the subsequent conversion of the document file content can be conducted so that each converted web page contains the optimal amount of text or graphics exactly matching the display capability of the targeted wireless terminal device.

Figure 4:
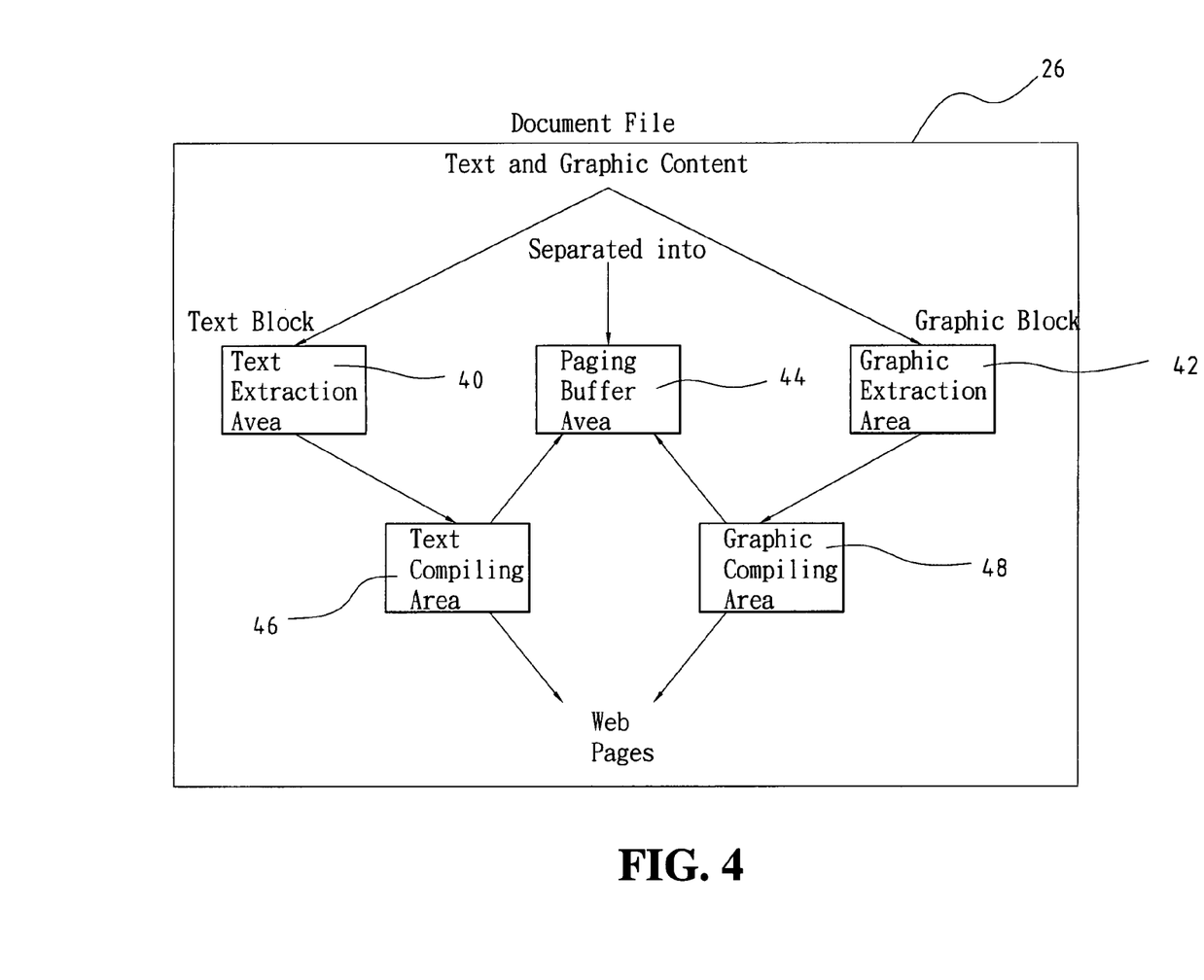
FIG. 4 is a schematic diagram showing the conversion unit of the present invention.

FIG. 4 is a schematic diagram showing the conversion unit 26 of the present invention. As shown in FIG. 4, the conversion unit 26 of the present invention is to convert document file content into web pages based on the matching code and the access request. The conversion unit 26 further contains a buffer area and a processing area. The buffer area contains a text extraction area 40, graphic extraction area 42, and paging buffer area 44. The processing area contains text compiling area 46 and the graphic compiling area 48.

As shown in FIG. 4, when a document file is converted into web pages, the text and graphics of the document file are separated into text blocks and graphic blocks and these blocks stored in the text extraction area 40 and the graphic extraction area 42 respectively. The paging buffer area 44, on the other hand, stores the paging information of the text blocks and the graphic blocks. The text blocks and the graphic blocks are then processed by the text compiling area 46 and the graphic compiling area 48 respectively.

Figure 5:
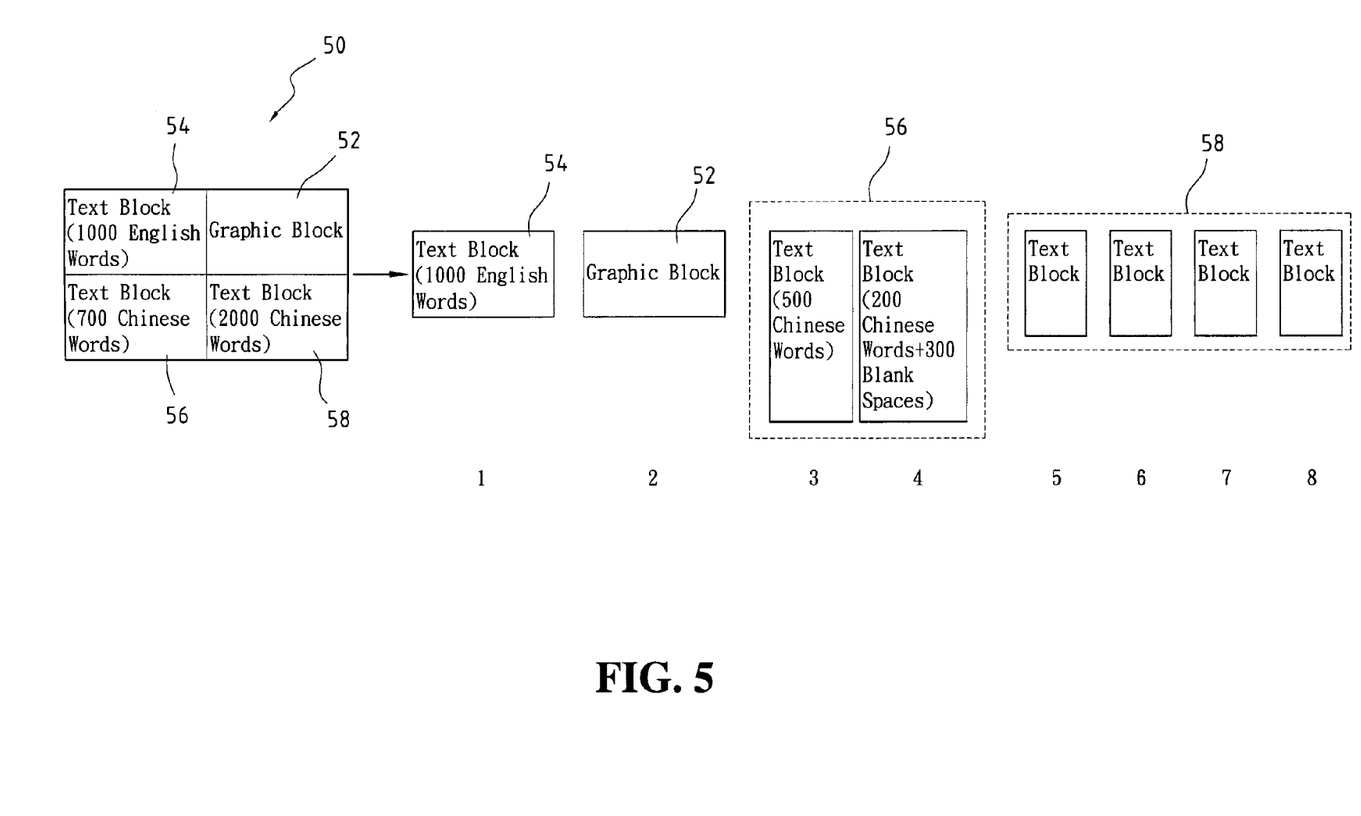
FIG. 5 is a schematic diagram showing a page in the document file is converted into eight web pages for viewing on a wireless terminal device.

FIG. 5 is a schematic diagram showing a page in the document file is converted into eight web pages for viewing on a wireless terminal device. As shown in FIG. 5, a document page 50 of a document file under the full-page mode contains a text block 54 having 1000 English words, a graphic block 52, a text block 56 having 700 Chinese words, and a text block 58 having 2000 Chinese words.

As mentioned earlier, the text blocks stored in the text extraction area 40 are processed to have the best display effect on the wireless terminal devices 7–9 based on the obtained matching code. Also as mentioned earlier the matching code carries quite a few pieces of display characteristics information. But for simplicity, only screen size is considered in the following explanation.

Assuming that the targeted wireless terminal device has a screen size 120×160 pixels and is able to show about 500 Chinese words or 1000 English words in a single screen, the text block 54 having 1000 English words thereby can be displayed entirely in a screen of the wireless terminal device. Therefore, as shown in FIG. 5, when the document page 50 is converted into web pages, the text block 54 is converted into a single web page by the text compiling area 46 and the web page is numbered as the first page. Then, the graphic block 52 is converted by the graphic compiling area 48 by shrinking the graphic block 52 proportionally (or by other similar methods) so that the conversion result can be displayed in a single web page numbered as the second page. The 700 Chinese words in the text block 56 is separated into two web pages, one with the first 500 Chinese words and the other one with the remaining 200 Chinese words and 300 blank spaces, numbered as the third and fourth page respectively. Similarly, the text block 58 is separated into four web pages numbered as page 5–8 respectively, each of which contains 500 Chinese words.

A very important feature of the present invention should be clear from the explanation above. The graphic images contained in the document file are separated from the text and shrunk to a much smaller size. As graphic images usually has a significant size that would slow down the transmission when transmitted in their original sizes. The present invention's separation of the text and graphics not only allows the viewer to see the text of the document file faster but also minimizes the overhead in sending the graphic images.

However, when the graphic block 52 is a very large picture or contains a lot of detailed information, shrinking the graphic block 52 as shown in FIG. 5 would make it unrecognizable.

Figure 6:
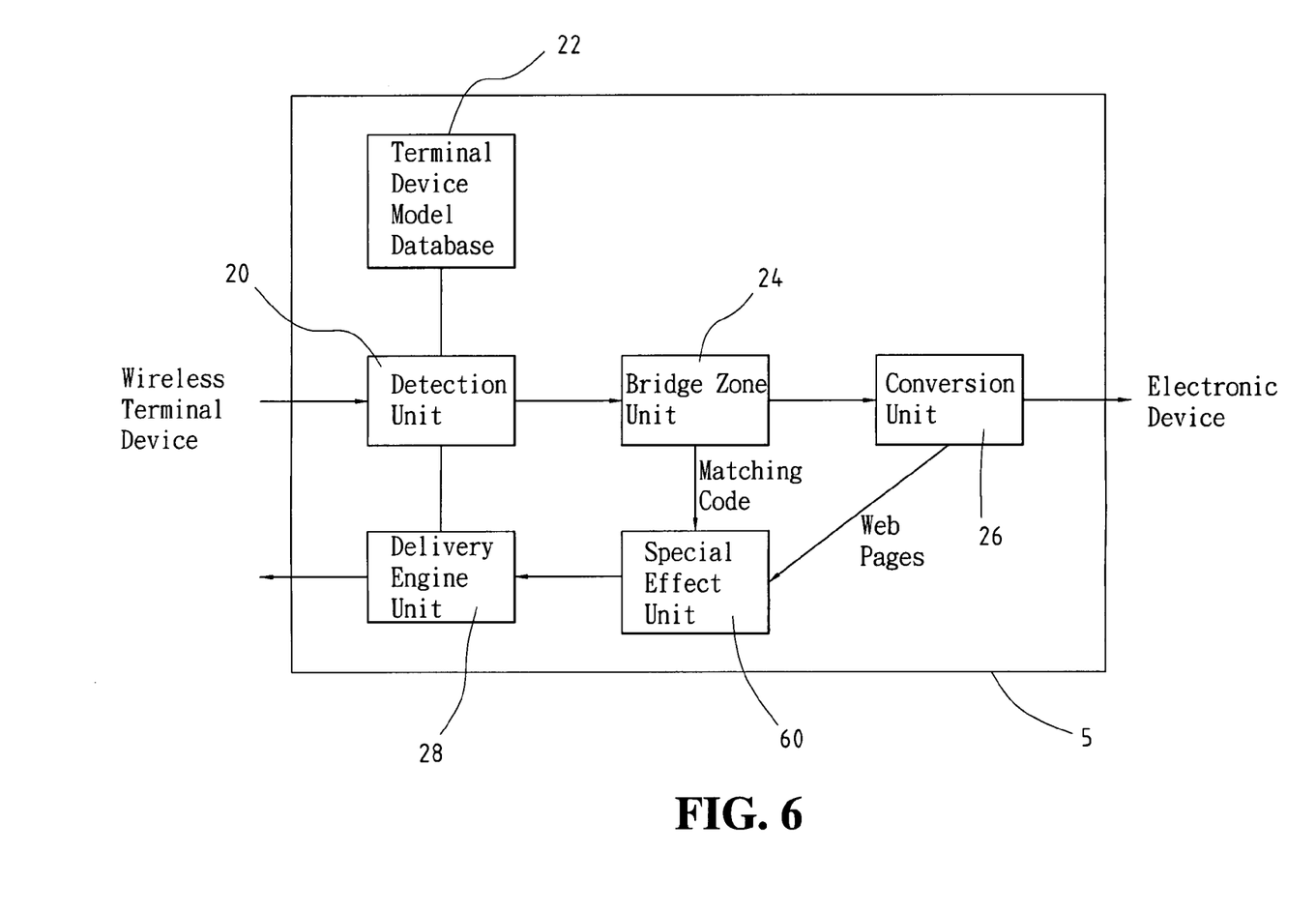
FIG. 6 is a schematic diagram showing a second embodiment of the management device according to the present invention.

FIG. 6 is a schematic diagram showing a second embodiment of the management device 5 according to the present invention. As shown in FIG. 6, a special effect unit 60 is added into the management device 5 to overcome the foregoing unrecognizable graphic problem or to enhance the display effect. For example, as shown in FIG. 3, the wireless terminal device 9's matching code contains a special effect of "tiling graphics." Therefore, when the graphic block 52 is converted for the wireless terminal device 9, the graphic block 52 will not be shrunk but transmitted as is, and the wireless terminal device 9 is able to show the much larger graphic block 52 by partitioning it into several screen-sized, smaller tiles. The special effect unit 60 can actually utilize a lot more display effects available from the wireless terminal devices than the "tiling graphics." As to the other special effects, they are omitted here for simplicity.

Figure 7:
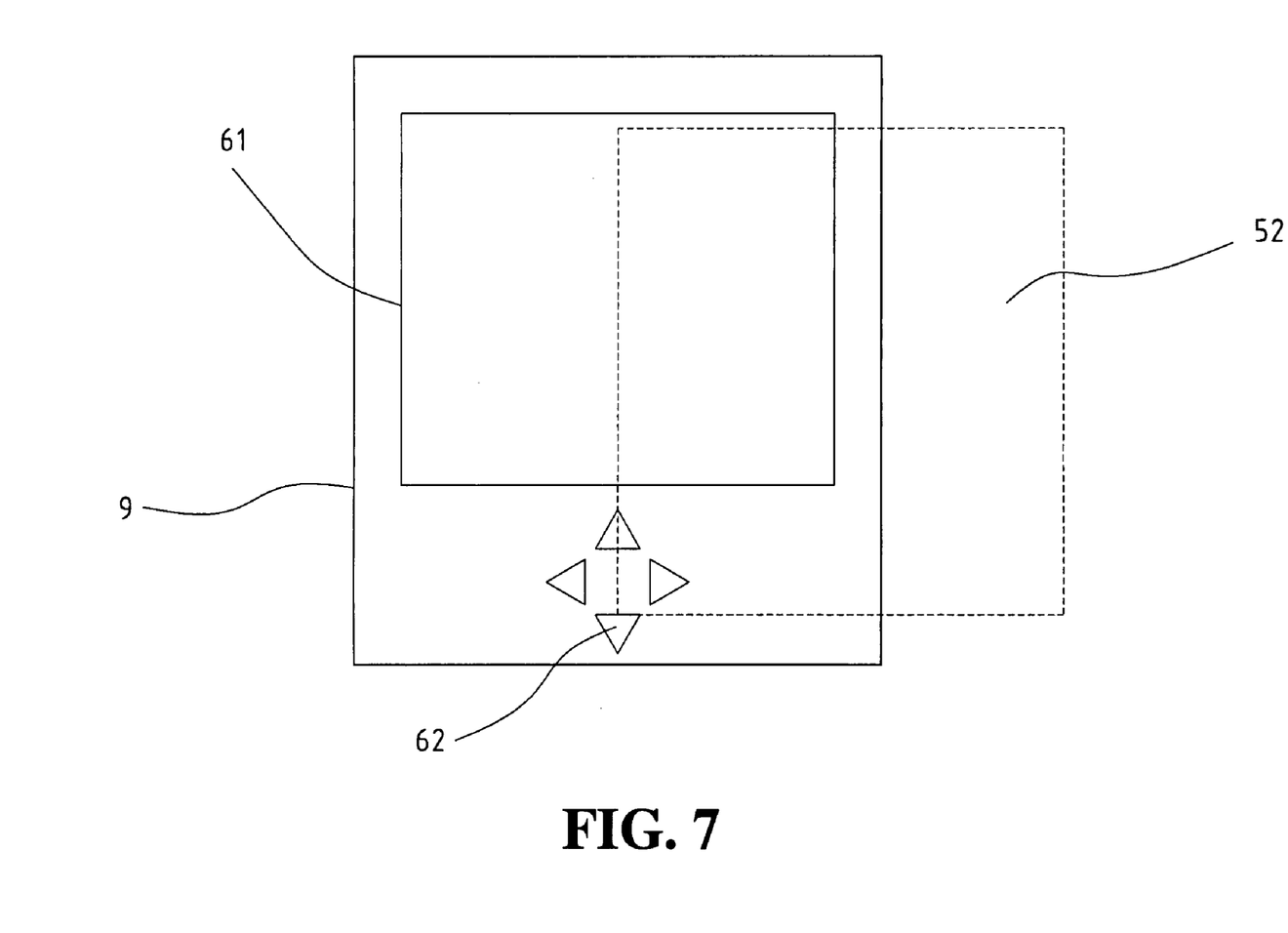
FIG. 7 is a schematic diagram showing how a graphic block is displayed on the smaller screen of the wireless terminal device.

FIG. 7 is a schematic diagram showing how a graphic block 52 is displayed on the smaller screen of the wireless terminal device 9 having the "tiling graphic" capability. As shown in FIG. 7, when the graphic block 52 is transmitted to the wireless terminal device 9, the navigation keys 62 of the wireless terminal device 9 can be used to view various portions of the graphic block 52 in the smaller screen 61.

Figure 8:
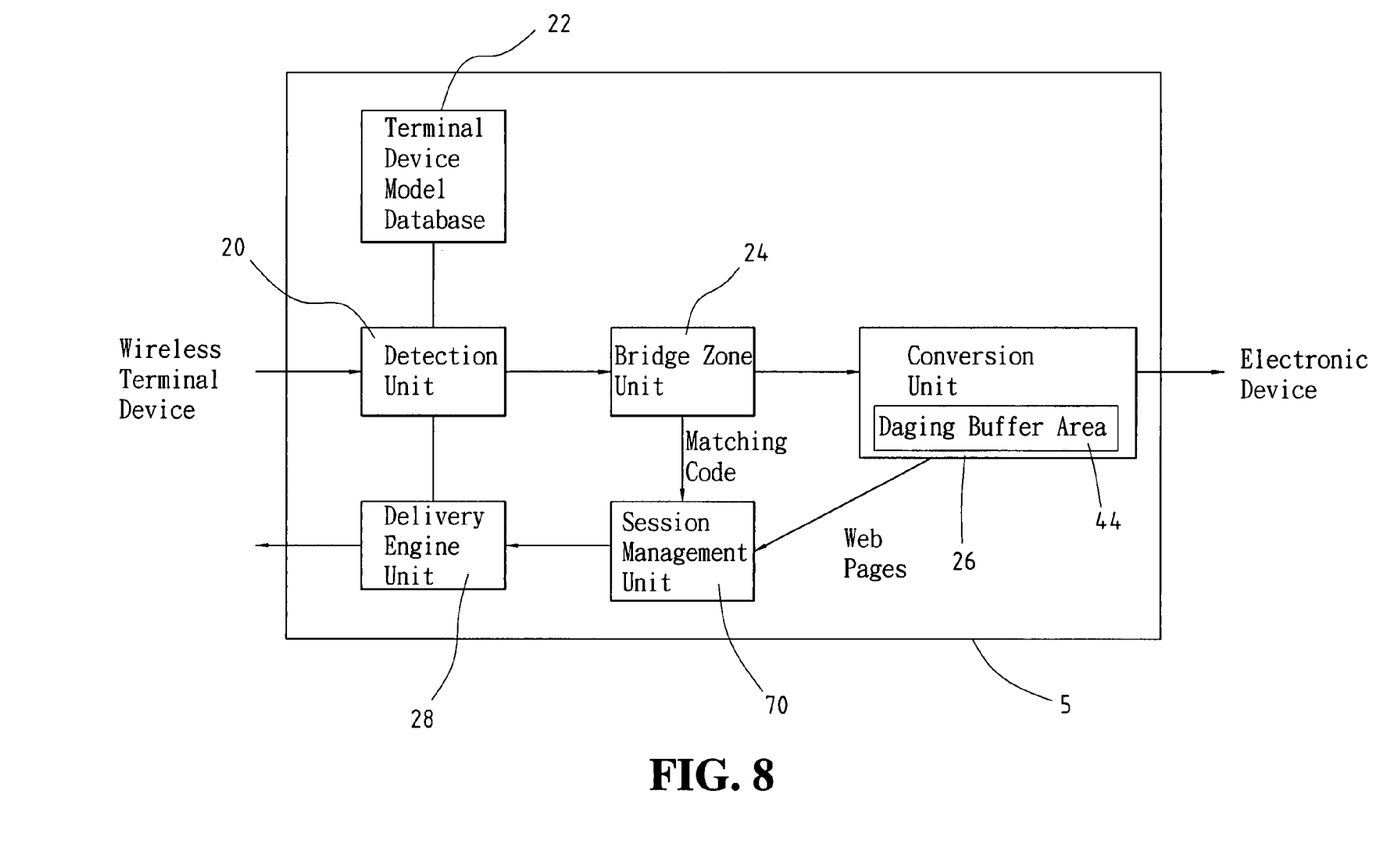
FIG. 8 is a schematic diagram showing a third embodiment of the management device according to the present invention.

FIG. 8 is a schematic diagram showing a third embodiment of the management device 5 according to the present invention. As shown in FIG. 8, a session management unit 70 is added into the management device 5. Based on the paging information stored in the paging buffer unit 44, the session management unit 70 controls the delivery of the web pages in a correct sequence to the delivery engine unit 28. The delivery engine unit 28 then compresses the web pages, packages the web pages into a number of packets according to the protocol used by the air interface, and sends out the packets in a pipeline fashion to the wireless terminal devices 7–9 to speed up the packet transmission and increase the utilization of the network bandwidth.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A remote document viewing system, comprising:
    a plurality of electronic devices, wherein each of said plurality of electronic devices has a browsing management unit, a plurality of directories and each of said plurality of directories has a plurality of document files;
    a management device, wherein said management device is connected to said electronic devices and, based on information provided by said browsing management unit of each electronic device, said document files' text and graphic content is converted according to said document files' formats into web pages viewable from a browser; and
    a plurality of wireless terminal devices, wherein each of said plurality of wireless terminal devices, by using a built-in browser, issues access requests to and receives said converted web pages from said management device via an air interface between said management device and said wireless terminal devices;
    wherein said management device further comprises:
    a detection unit utilizing a wireless terminal model database to obtain display characteristics information about a wireless terminal device;
    a bridge zone area combining said display characteristics information into a matching code corresponding to said wireless terminal device;
    a conversion unit transforming a document file's text and graphic content under a full page mode based on said matching code into a plurality of web pages viewable by a browser; and
    a delivery engine unit transmitting said plurality of web pages to said wireless terminal device via said air interface;
    and wherein said display characteristics information comprises a brand name, model number, screen size, resolution, color depth, buffer size, special presentation, and a special effect.

2. The remote document viewing system according to claim 1, wherein each of said plurality of electronic devices is a device selected from the group consisting of desktop computers, server computers, and notebook computers.

3. The remote document viewing system according to claim 1, wherein said management device is connected to said plurality of electronic devices to receive directory and document file information from said browsing management unit of each electronic device, and is connected to a wireless base station to receive said access requests from and to send said converted web pages to said wireless terminal devices.

4. The remote document viewing system according to claim 1, wherein each of said plurality of document files has a format selected from the group consisting of a file containing text and graphics, a spreadsheet file, a presentation file, a graphic image, a Portable Document Format file, a pure text file, and a HTML file.

5. The remote document viewing system according to claim 1, wherein each of said plurality of wireless terminal devices is a device selected from the group consisting of a PHS handset, an i-Mode handset, a GPRS handset, a PDA with appropriate networking module, a Pocket PC with appropriate networking module, and a notebook computer with appropriate networking module.

6. The remote document viewing system according to claim 1, wherein said web pages have a format selected from the group consisting of WML, DHTML, PDX, CHTML, XML, and XHTML.

7. The remote document viewing system according to claim 1, wherein said conversion unit further comprises:
 a text extraction area for storing text blocks separated from said document file's text and graphic content;
 a graphic extraction area for storing graphic blocks separated from said document file's text and graphic content; and
 a paging buffer area for storing paging information for said text and graphic blocks.

8. The remote document viewing system according to claim 7, wherein said conversion unit further comprises a text compiling area for converting said text blocks stored in said text extraction area into a plurality of web pages based on said matching code for viewing by said wireless terminal device.

9. The remote document viewing system according to claim 7, wherein said conversion unit further comprises a graphic compiling area for converting said graphic blocks stored in said graphic extraction area into a plurality of web pages based on said matching code for viewing by said wireless terminal device.

10. The remote document viewing system according to claim 7, wherein said management device further comprises a session management unit for controlling an in order delivery of said web pages to said delivery engine unit based on said paging information stored in said paging buffer area.

11. The remote document viewing system according to claim 1, wherein said management device further comprises a special effect unit for adding special effects into said web pages based on said matching code.

12. The remote document viewing system according to claim 1, wherein said delivery engine unit compresses said web pages, packages said compressed web pages into a plurality of packets according to a protocol used by said air interface, and sends out said packets in a pipeline fashion to said wireless terminal device.

13. A method for a wireless terminal device equipped with a browser to view a document file stored in a remote electronic device, comprising the steps of:
 (a) obtaining display characteristics information about said wireless terminal device from a wireless terminal model database;
 (b) combining said display characteristics information into a matching code corresponding to said wireless terminal device;
 (c) converting a page of said document file under a full page mode into a plurality of web pages based on said matching code; and
 (d) transmitting said web pages to said wireless terminal device via an air interface;
 wherein said display characteristics information comprises a brand name, model number, screen size, resolution, color depth, buffer size, special presentation, and a special effect.

14. The method according to claim 13, wherein said step (c) further comprises the steps of:
 (a') separating text blocks from said page and storing said text blocks in a text extraction area;
 (b') separating graphic blocks from said page and storing said graphic blocks in a graphic extraction area;
 (c') storing paging information about said text blocks and said graphic blocks in a paging buffer area; and
 (d') converting said text and graphic blocks into a plurality of web pages.

15. The method according to claim 14, wherein said step (d') further comprises the steps of:
 (a") calculating a display format based on said matching code;
 (b") putting said text blocks into a plurality of web pages based on said display format; and
 (c") numbering said plurality of web pages based on information in said paging buffer area and said text blocks' position in said page.

16. The method according to claim 14, wherein said step (d') further comprises the steps of:
 (1) calculating a display format based on said matching code;
 (2) putting said graphic blocks into a plurality of web pages based on said display format; and
 (3) numbering said plurality of web pages based on information in said paging buffer area and said graphic blocks' position in said page.

17. The method according to claim 14, wherein said paging information in said paging buffer area helps sequencing said web pages in a correct order when transmitted to said wireless terminal device.

18. The method according to claim 13, wherein said step (c) further comprises the step of adding a special effect into said plurality of web pages based on said matching code.

19. The method according to claim 13, wherein said step (d) further comprises the steps of:
 (i) compressing said plurality of web pages;
 (ii) packaging said plurality of compressed web pages into packets according to a protocol used by said air interface; and
 (iii) transmitting said packets in a pipeline fashion to said wireless terminal device.

* * * * *